(12) United States Patent  (10) Patent No.: US 7,520,482 B2
Shin  (45) Date of Patent: Apr. 21, 2009

(54) CUP HOLDER FOR VEHICLES

(75) Inventor: Je Hoon Shin, Yongin (KR)

(73) Assignee: Hyundai Motor Company, Seoul (KR)

( * ) Notice: Subject to any disclaimer, the term of this patent is extended or adjusted under 35 U.S.C. 154(b) by 363 days.

(21) Appl. No.: 11/242,449

(22) Filed: Oct. 3, 2005

(65) Prior Publication Data

US 2006/0076468 A1   Apr. 13, 2006

(30) Foreign Application Priority Data

Oct. 2, 2004 (KR) .................. 10-2004-0078537

(51) Int. Cl.
*A47G 23/02* (2006.01)
(52) U.S. Cl. ............... 248/311.2; 248/313; 248/316.1; 224/926
(58) Field of Classification Search ............ 248/311.2, 248/313, 314, 311.3, 316.1; 224/926
See application file for complete search history.

(56) References Cited

U.S. PATENT DOCUMENTS 5,072,989 A * 12/1991 Spykerman et al. .... 297/188.16
5,921,519 A * 7/1999 Dexter et al. ............. 248/311.2
6,361,008 B1 * 3/2002 Gravenstreter ........... 248/311.2
6,779,769 B1 * 8/2004 York et al. ............... 248/311.2
7,168,669 B2 * 1/2007 Park ........................ 248/311.2

FOREIGN PATENT DOCUMENTS

| DE | 102005038 683 | 3/2006 |
| EP | 1431114 | 6/2004 |
| EP | 1627770 | 2/2006 |
| JP | 2006001428 | 1/2006 |

* cited by examiner

*Primary Examiner*—Korie H. Chan
*Assistant Examiner*—Steven Marsh
(74) *Attorney, Agent, or Firm*—Morgan, Lewis & Bockius LLP

(57) ABSTRACT

A cup holder for vehicles provided by the present invention enables stable positioning of a beverage container within a vehicle regardless of the container's shape or size and allows the beverage container to be readily inserted or removed as one desires.

3 Claims, 11 Drawing Sheets

CUP HOLDER FOR VEHICLES

CROSS-REFERENCE TO RELATED APPLICATION

This application claims priority of Korean Patent Application 10-2004-0078537 in the Korean Intellectual Property Office filed on Oct. 2, 2004, the disclosure of which is incorporated fully herein by reference.

BACKGROUND OF THE INVENTION (a) Field of the Invention

The present invention relates to a cup holder. More specifically, the present invention relates to a cup holder that can accommodate beverage containers of various shapes and sizes and provide stability in the positioning of the container within a vehicle.

(b) Description of the Related Art

Generally, vehicles are equipped with cup holders as a means by which beverage containers, e.g. beverage can, cup, bottle, can be held in place while the vehicle is in motion or otherwise. A cup holder is commonly attached to a console within the vehicle, the back side of a seat, or a predetermined location that is accessible to the vehicle's occupants. The structure of a cup holder typically includes a hole or cavity in which a beverage container can be inserted.

However, cup holders of the prior art are ill-suited for holding containers of various shapes and sizes, oftentimes leaving spaces between the cup holder and a given beverage container that has been inserted therein. This poor fit between the cup holder and a beverage container can result in spillage of the beverage or dislodgement of the entire container when the vehicle is in motion or subjected to vibrations or noise, e.g. when the vehicle is driven over unpaved or poorly surfaced roads.

FIGS. 5A-C provide examples of cup holders of the prior art, wherein rubbers 120 or supporting members 200 are attached to a interior wall of an insertion hole 110 of a main body portion 100. Where the beverage container 400 is held in place by the rubbers 120, as shown in FIG. 5A, permanent deformation of the rubbers 120 can occur with repeated use, resulting in their loss of function. In the case where the beverage container 400 is held in place by elastic supporting member 200, as shown in FIG. 5B, the supporting member 200 can be broken or reversibly bent when a beverage container 400 with a protruding lower portion is drawn out from the cup holder, causing said lower portion to jam against the supporting member 200. Additionally, where the supporting members 200 are mounted under hinges 300, as shown in FIG. 5C, the beverage container has a tendency to fall downwards. As such, there is a need for a cup holder that sidesteps the pitfalls described above, accommodates beverage containers of various shapes and sizes, and provides stability in the positioning of the container within a vehicle.

The above information is presented solely to enhance understanding of the background of the present invention and should not be construed as an admission of such as prior art.

SUMMARY OF THE INVENTION

The present invention has been made in an effort to provide a cup holder for vehicles that can accommodate beverage containers of various shapes and sizes and provide stability in the positioning of the container.

In one aspect of the present invention, the cup holder includes a main body defining an insertion hole or cavity for holding a beverage container and at least one supporting unit located at one side of the insertion hole and configured to support the beverage container. The supporting unit comprises a body portion, which is connected to the cup holder main body and defines a receiving space, and at least one guide groove, a supporting member coupled to the at least one guide groove through at least one protruding pin such that the supporting member is movable in the receiving space of the body portion, and at least one elastic member supporting the supporting member and corresponding to movement of the supporting member.

In one embodiment of the present invention, the at least one guide groove comprises a first guide groove located in an upper region of the body portion and a second guide groove located in an area below the first guide groove. In another embodiment of the invention, the at least one protruding pin comprises a first protruding pin formed on a lateral axis of the supporting member so as to allow movement of the first protruding pin along the first guide groove, and a second protruding pin formed under the first protruding pin and attached to the supporting member so as to allow movement of the second protruding pin along the second guide groove. In yet another embodiment of the invention, the first guide groove comprises a first portion that extends in a substantially vertical path and a second portion extends in a substantially horizontal path from said first portion, and wherein the second guide groove extends in a substantially horizontal path. In still another embodiment of the invention, the at least one elastic member comprises a first elastic member providing an elastic force to move the supporting member 20 upwards with respect to the main body, and a second elastic member to rotate the supporting member 20 with respect to the main body.

DETAILED DESCRIPTION OF THE EMBODIMENTS

The present invention will hereinafter be described in detail with reference to the accompanying drawings.

Figure 1:
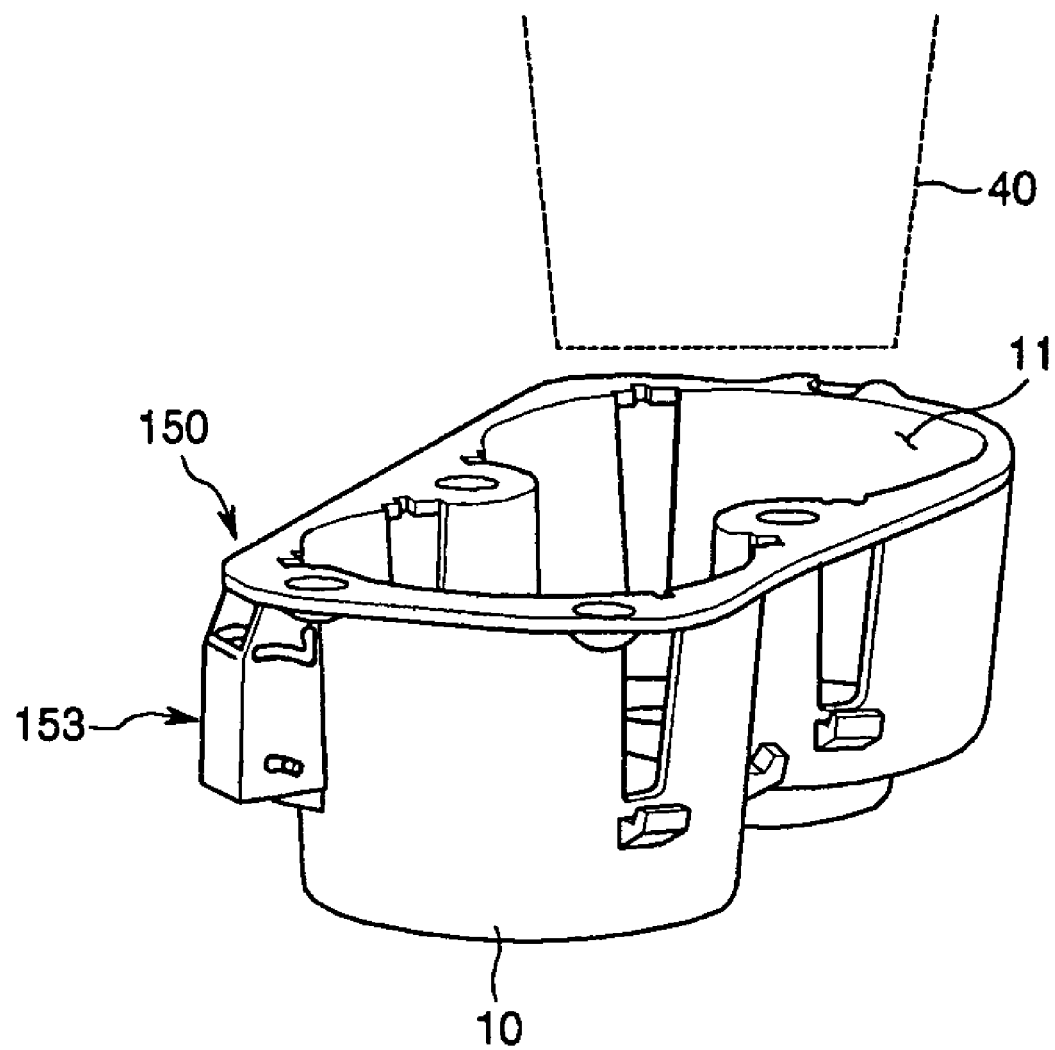
FIG. 1 shows a cup holder for vehicles according to an exemplary embodiment of the present invention.
Figure 2:
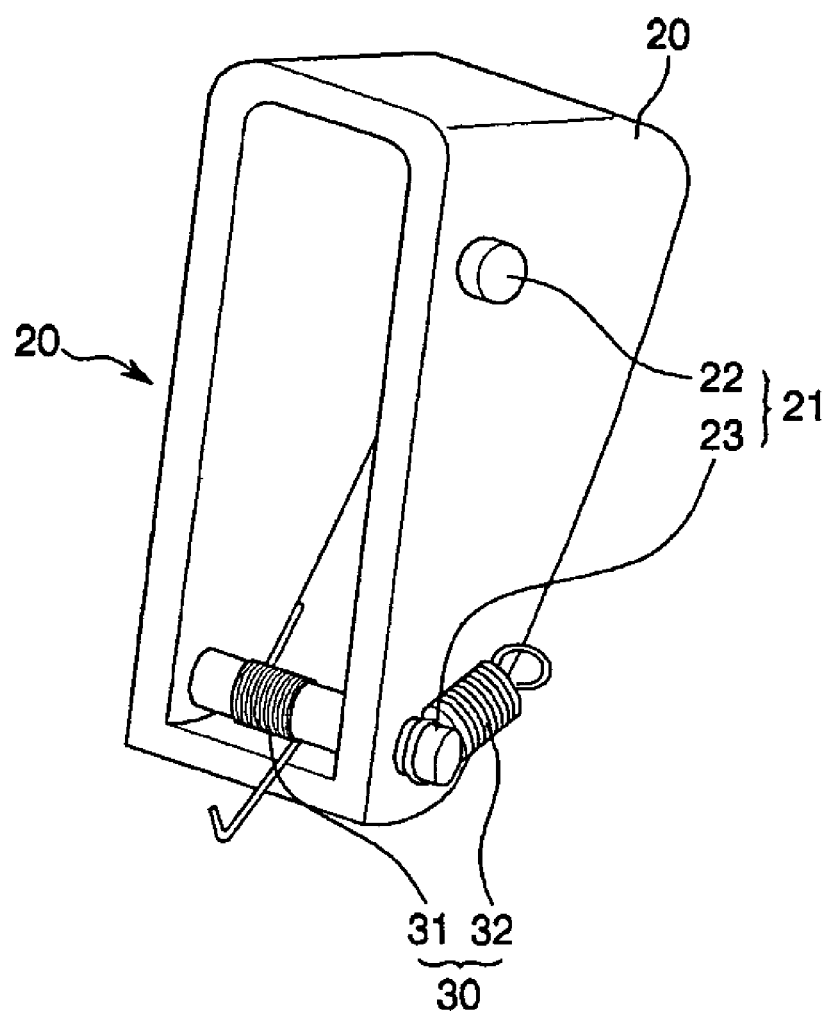
FIG. 2 is a perspective view of a supporting unit and elastic members of the cup holder for vehicles according to an exemplary embodiment of the present invention.
Figure 3A:
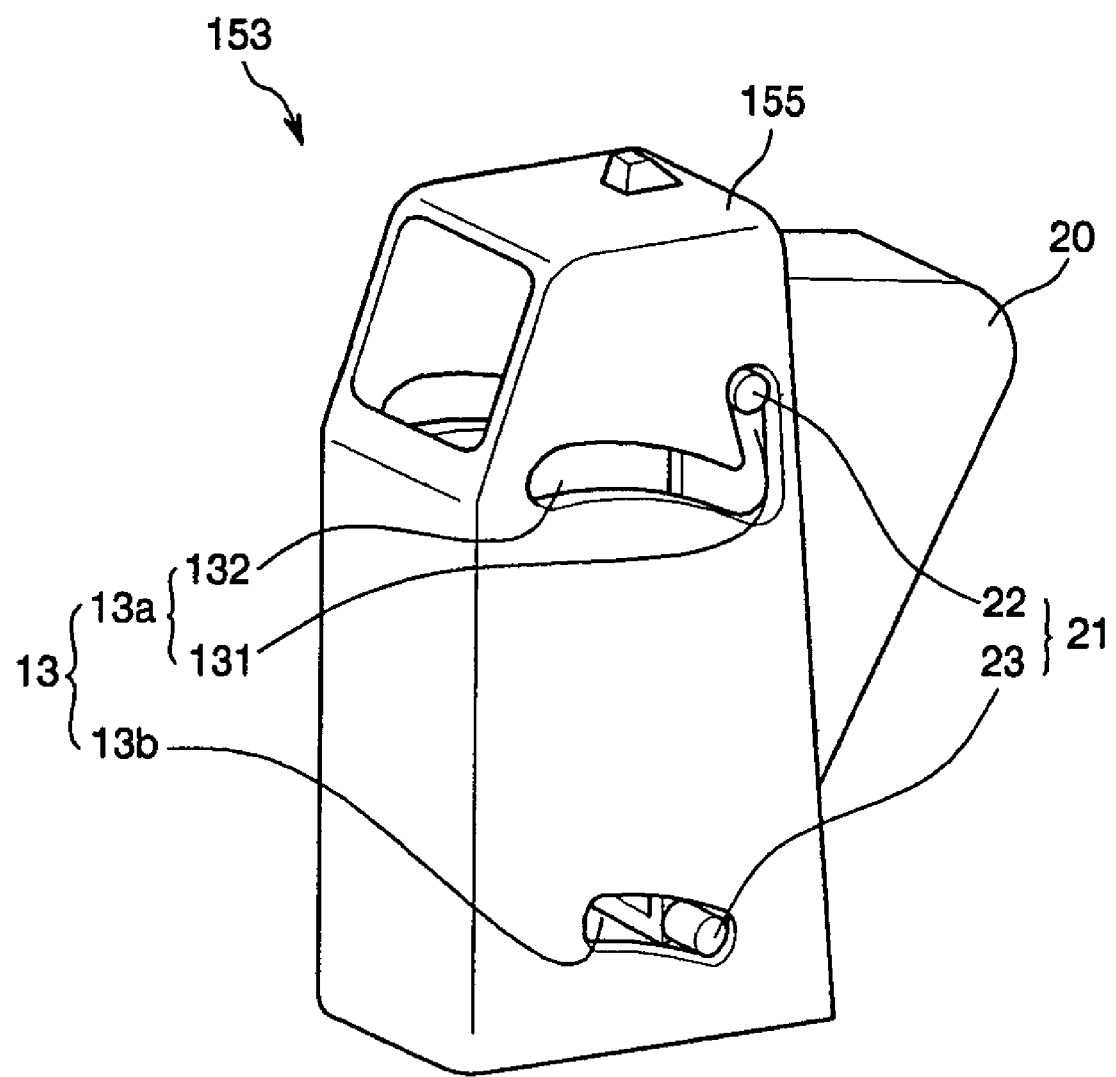
FIG. 3A to FIG. 3C are schematic diagrams of a supporting unit of the cup holder for vehicles according to an exemplary embodiment of the present invention.
Figure 3B:
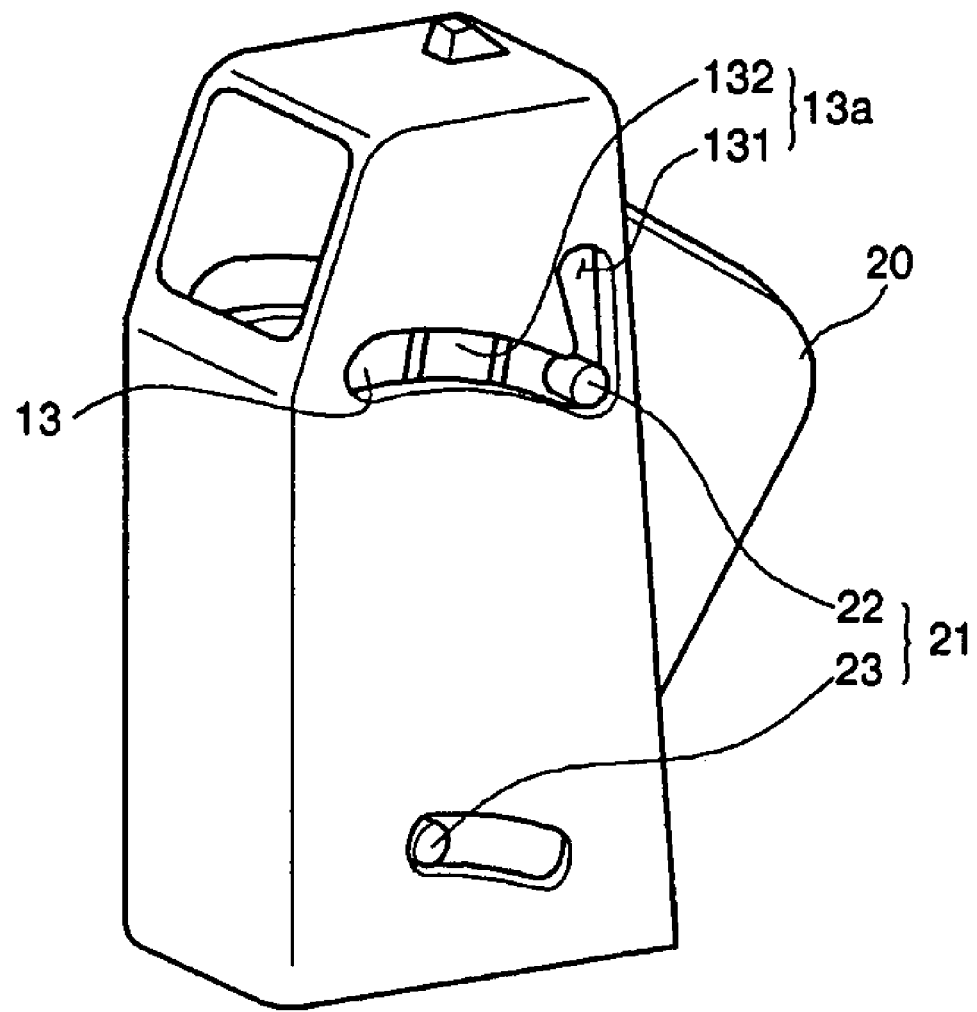
Figure 3C:
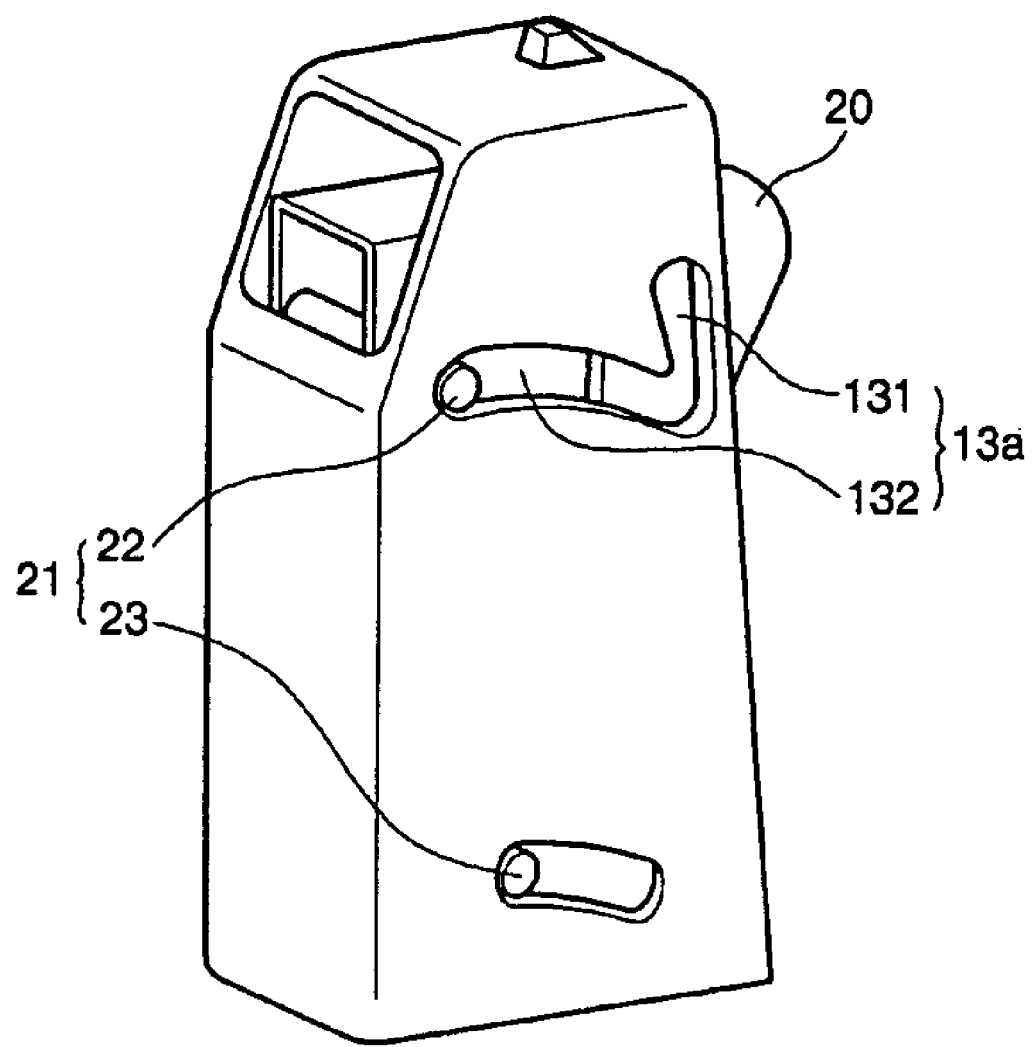
Figure 4A:
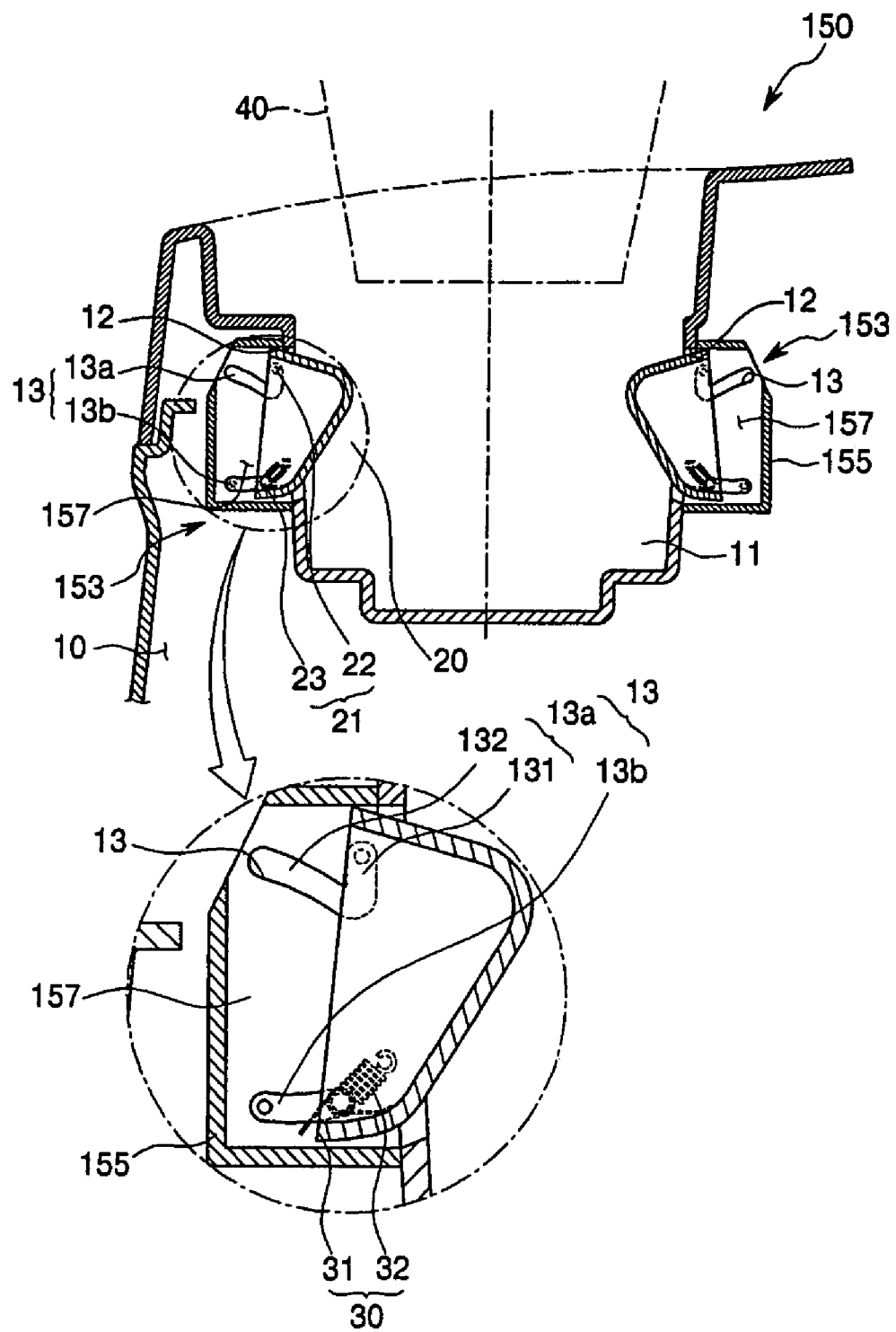
FIG. 4A to FIG. 4C are schematic diagrams of a cup holder for vehicles according to an exemplary embodiment of the present invention.
Figure 4B:
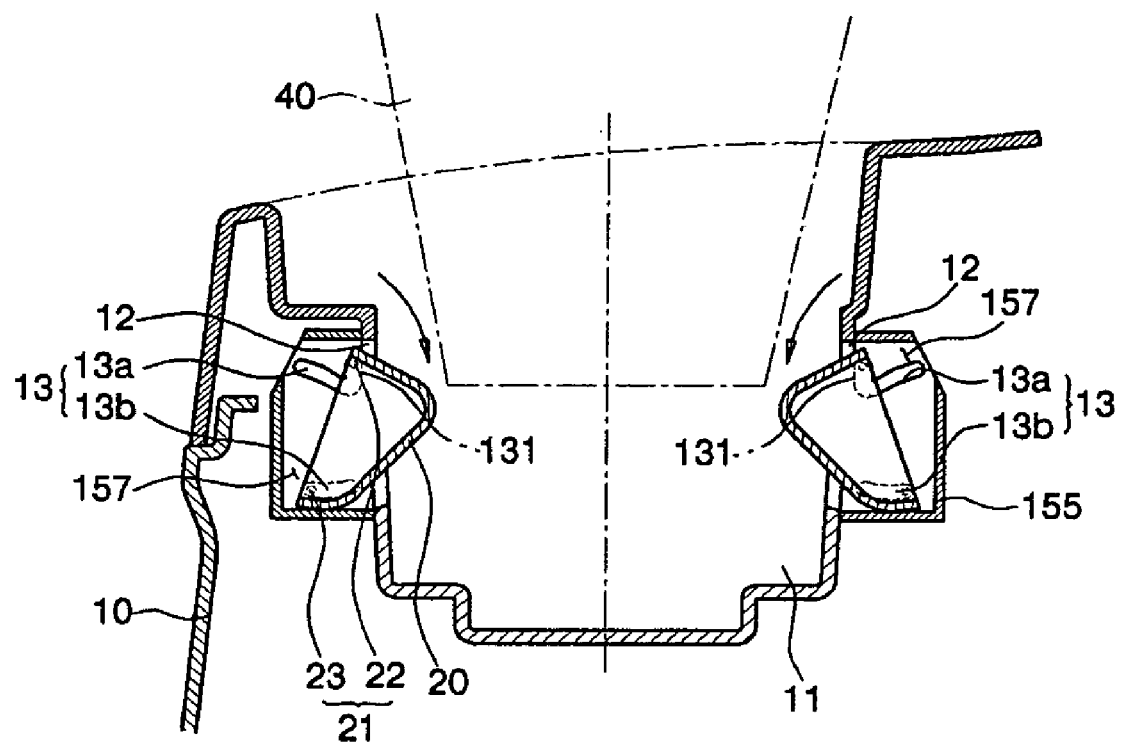
Figure 4C:
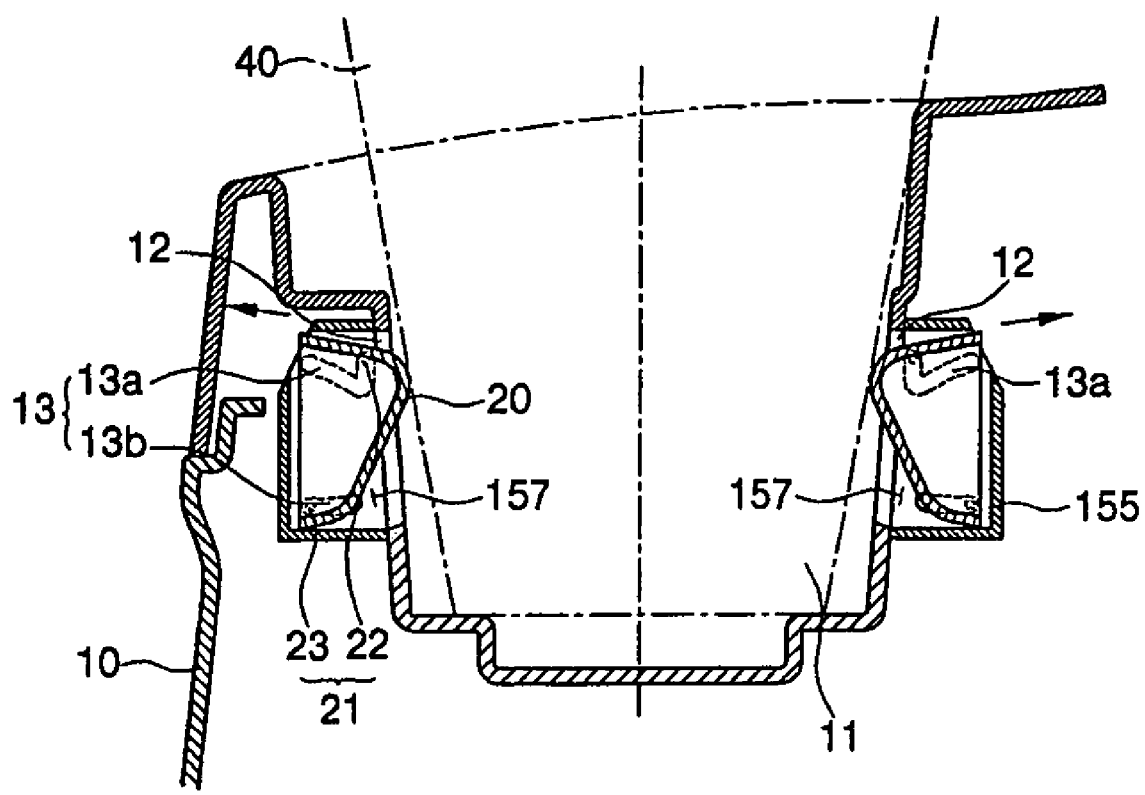
Figure 5A:
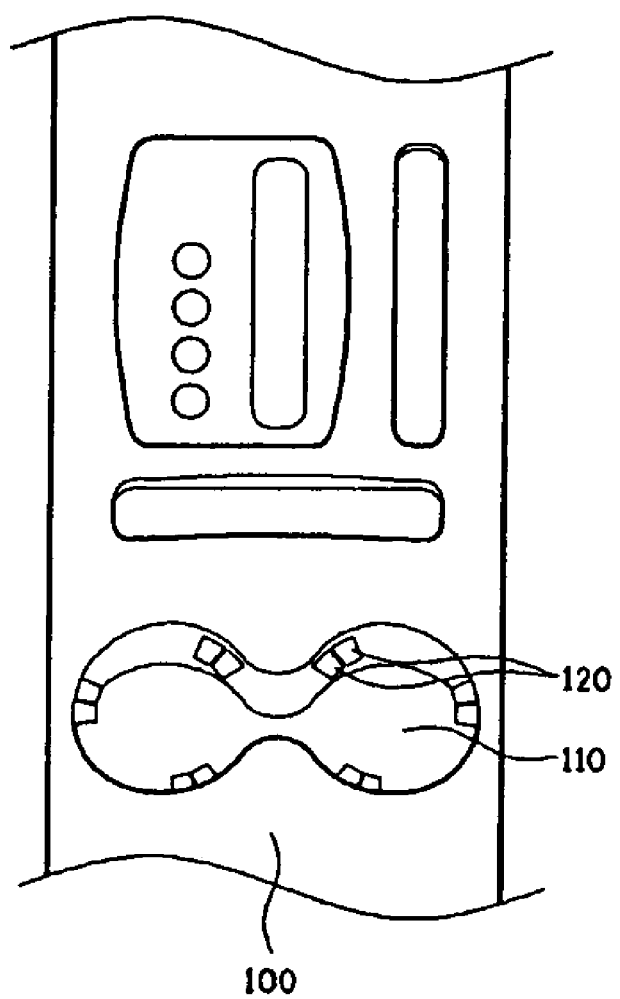
FIG. 5A to FIG. 5C are schematic diagrams of cup holders of the prior art.
Figure 5B:
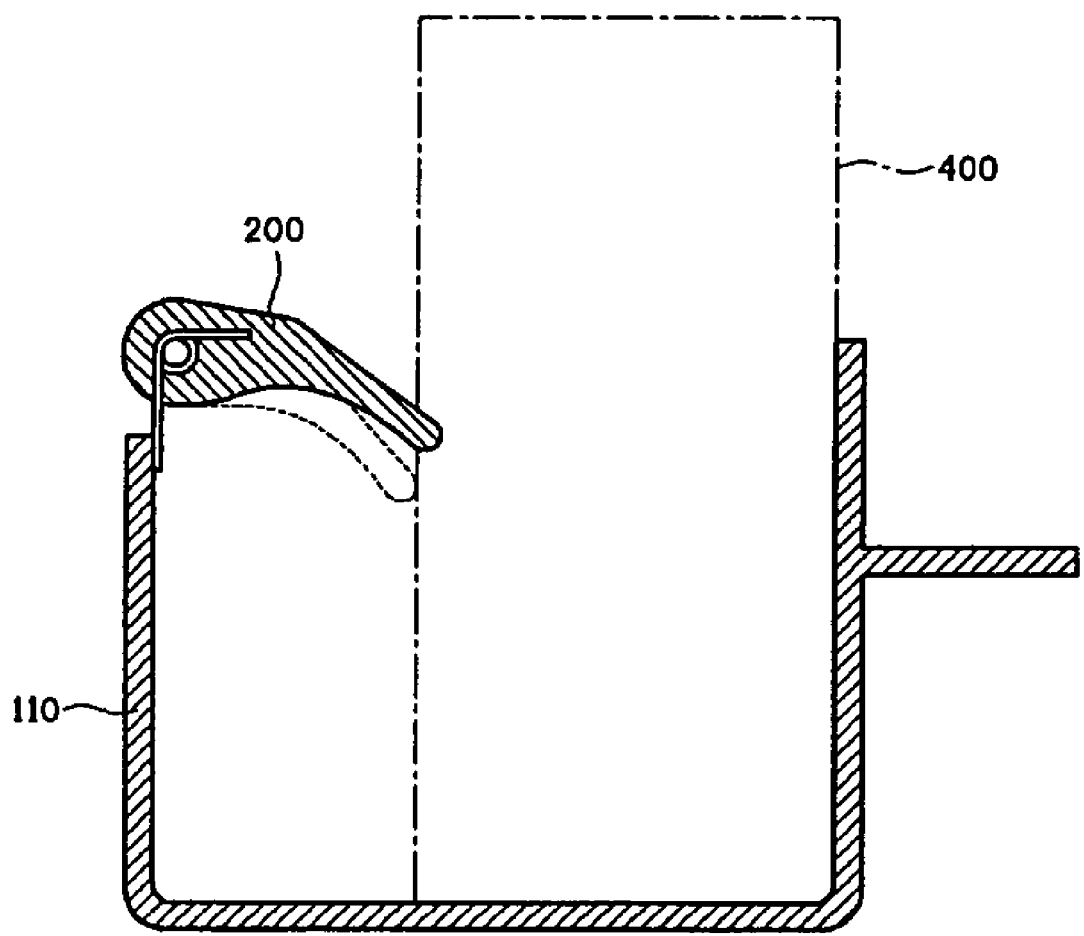
Figure 5C:
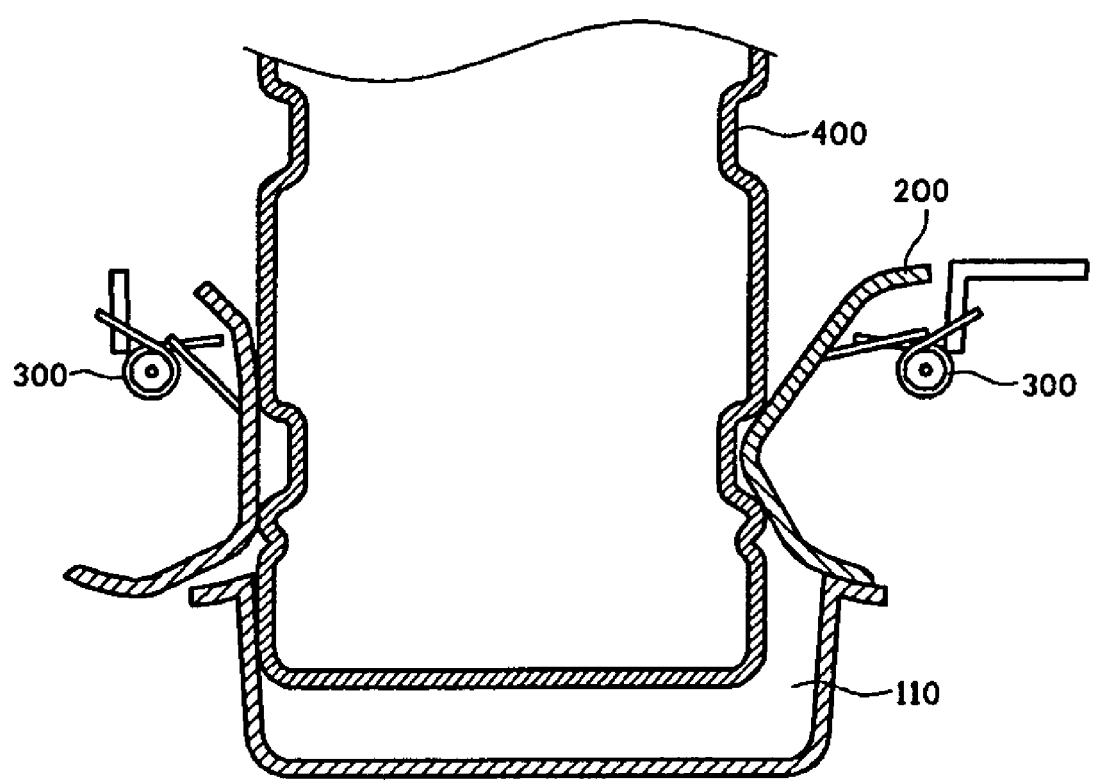

FIG. 1 shows a cup holder for vehicles according to an exemplary embodiment of the present invention; FIG. 2 is a perspective view of a supporting unit and elastic members of the cup holder for vehicles according to an exemplary embodiment of the present invention; FIG. 3A to FIG. 3C are schematic diagrams of a supporting unit of the cup holder for vehicles according to an exemplary embodiment of the present invention; FIG. 4A to FIG. 4C are schematic diagrams of a cup holder for vehicles according to an exemplary embodiment of the present invention.

As shown in FIG. 1, a cup holder 150 for vehicles includes a main body 10 and a supporting unit 153. At least one insertion hole 11 is formed in the main body 10 for receiving beverage container 40. At least one supporting unit 153 is located at one side of insertion hole 11 and configured to support the beverage container 40.

As shown in FIG. 3A, the supporting unit 153 includes a body portion 155, a supporting member 20, and at least one elastic member 30.

As shown in FIG. 4A, the supporting unit 153 is secured to an inner hole 12 that is formed to the main body 10. The body portion 155 is connected to the main body 10 of the cup holder 150 and forms a receiving space 157, and at least one guide groove 13 is formed thereto. More particularly, the body portion 155 is connected to the inner hole 12 of the main body 10. The body portion 155 may be formed integrally with the main body 10, or the body portion 155 may be separately formed then connected to the main body 10.

As shown in FIGS. 4A-C, the supporting member 20 is coupled to at least one guide groove 13 through at least one protruding pin 21 such that the supporting member 20 is movably disposed in the receiving space 157 of the body portion 155. According to one exemplary embodiment of the present invention, two protruding pins, designated as 21 in the schematic, and two guide grooves, designated as 13, corresponding thereto are provided.

In another embodiment of the present invention, as shown in FIG. 2, at least one elastic member 30 elastically supports a supporting member 20 in a manner that corresponds with movement of the supporting member 20. One end of at least one elastic member 30 is secured to the protruding pin 21, and details thereof are described in the following disclosure.

As illustrated by FIGS. 3A-C, the at least one guide groove 13 comprises a first guide groove 13a and a second guide groove 13b. The first guide groove 13a is formed in the body portion 155 and the second guide groove 13b is formed in an area below the first guide groove 13a.

As shown by FIG. 3A, at least one protruding pin 21 comprises a first protruding pin 22 and a second protruding pin 23. The first protruding pin 22 is formed on a lateral side of the supporting member 20 to allow movement of the first protruding pin 22 along the first guide groove 13a. The second protruding pin 23 is formed below the first protruding pin 22 and attached to the supporting member 20 so as to allow movement of the second protruding pin 23 along the second guide groove 13b. The protruding pin 21 may be formed integrally with the supporting member 20, or may be separately formed and connected to the supporting member 20. To operate, the first protruding pin 22 moves along the first guide groove 13a by being inserted therein, and the second protruding pin 23 moves along the second guide groove 13b by being inserted therein.

As shown in FIGS. 3A-C, the first guide groove 13a includes a first portion 131 that extends in a substantially vertical path and a second portion 132 that extends in a substantially horizontal path from the first portion 131. The second guide groove 13b likewise extends in a substantially horizontal path. During operation, the first protruding pin 22 can move either vertically or horizontally along the first guide groove 13a while the second protruding pin 23 can move horizontally along the second guide groove 13b.

As shown in FIG. 2, at least one elastic member 30 comprises a first elastic member 31 that provides an elastic force to move the supporting member 20 upwards with respect to the main body 10. A second elastic member 32 provides an elastic force to rotate the supporting member 20 with respect to the main body 10.

In an exemplary embodiment of the present invention, the first elastic member 31 is a torsion spring and the second elastic member 32 is a tension spring. The first elastic member 31 and the second elastic member 32 are mounted to the second protruding pin 23 which penetrates the supporting member 20. The first elastic member 31 is mounted to a portion of the second protruding pin 23 that is within the supporting member 20, and the second elastic member 32 is mounted to a portion of the second protruding pin 23 that protrudes outwards from the supporting member 20. As illustrated in FIG. 2, one end of the first elastic member 31 is responsible for supplying the elastic force to an interior surface of the supporting member 20 and a lower surface of the receiving space 157 of the body portion 155. In addition, one end of the second elastic member 32 is secured to the second protruding pin 23, and another end thereof is secured to a lateral side of the body portion 155 of the receiving space 157.

The schematic for one exemplary embodiment of the cup holder 150 is shown in FIGS. 4A-C. FIG. 4A depicts a state prior to insertion of a beverage container 40. FIG. 4B depicts a state wherein the beverage container 40 is being inserted into the cup holder 150 and the weight of said container 40 pushes onto the supporting member 20. FIG. 4C shows a subsequent state wherein the beverage container 40 is completely inserted into the cup holder 150.

For the sake of clarity, operation of the cup holder will be explained below in reference to the supporting unit 153 on the left-hand side in FIGS. 4A-C.

In FIG. 4A, prior to insertion of the beverage container 40 into cup holder 150, the supporting member 20 protrudes into the insertion hole 11 of the main body 10 due to the elastic force exerted by elastic member 21. The first protruding pin 22 is located at the upper end of the first portion 131 of the first guide groove 13a, and the second protruding pin 23 is located at the right of the second guide groove 13b.

As the beverage container 40 is being inserted, the supporting member 20 will move downwards if the beverage container 40 pushes the supporting member 20 downwards. In said scenario, as shown in FIG. 4B, the first protruding pin 22 will move downwards along the path of first portion 131 of the first guide groove 13a, and the second protruding pin 23 will move along the second guide groove 13b outwards from insertion hole 1.

Referring to arrows in FIG. 4C, when the beverage container 40 is almost completely in the insertion hole 11, i.e. bottom of the beverage container 40 is about to contact the bottom of insertion hole 11, the upper portion of the supporting member 20 rotates outwards away from insertion hole 11. At this time, the second protruding pin 23 serves as a hinge, as shown in FIG. 4C. Once the beverage container 40 is completely inserted into insertion hole 11, the beverage container 40 is secured into place by the elastic force of elastic member 30 on supporting member 20.

The two guide grooves 13 and protruding pins 21 of the present invention allows a beverage container to be readily inserted or removed as one desires. Furthermore, an exemplary embodiment of the present invention allows beverage containers of various shapes and sizes to be more readily inserted or withdrawn from the insertion hole. With the inclusion of the two elastic members 30 (equivalent to the combination of 31 and 32), the beverage container would not fall down and cause spillage in the presence of vibrations in the vehicle.

It is understood that the embodiments described herein are for illustrative purposes only and that various modifications or changes in light thereof will be suggested to persons skilled in the art and are to be included within the spirit and purview of this application and scope of the appended claims.

What is claimed is:

1. A cup holder in vehicles that comprises:
a main body defining an insertion hole for receiving a beverage container; and
at least one supporting unit located at one side of the insertion hole and configured to support the beverage container, wherein the supporting unit comprises:
a body portion which is connected to the main body, and defines a receiving space, a first guide groove located in an upper region of the body portion, and a second guide groove located in an area below the first guide groove;
a supporting member comprising a first protruding pin on a lateral axis of the supporting member, disposed in the first guide groove and translationally movable within the first guide groove, and a second protruding pin below the first protruding pin, disposed in the second guide groove and translationally movable within the second guide groove, such that the supporting member is movable in the receiving space of the body portion; and
at least one elastic member supporting the supporting member and corresponding to movement of the supporting member.

2. The cup holder of claim 1, wherein the first guide groove comprises:
a first portion that extends in a substantially vertical path; and
a second portion that extends in a substantially horizontal path from the first portion, and wherein the second guide groove extends in a substantially horizontal path.

3. The cup holder of claim 1, wherein the at least one elastic member comprises:
a first elastic member providing an elastic force to move the supporting member upwards with respect to the main body; and
a second elastic member to rotate the supporting member with respect to the main body.

* * * * *